United States Patent
Kiener et al.

(10) Patent No.: US 11,835,397 B2
(45) Date of Patent: Dec. 5, 2023

(54) DUMMY FOR MONITORING THE MOLDING PROCESS

(71) Applicant: Gerresheimer Regensburg GmbH, Regensburg (DE)

(72) Inventors: Richard Kiener, Oberviechtach (DE); Andreas Sajons, Wernberg-Köblitz (DE)

(73) Assignee: Gerresheimer Regensburg GmbH, Regensburg (DE)

( * ) Notice: Subject to any disclaimer, the term of this patent is extended or adjusted under 35 U.S.C. 154(b) by 74 days.

(21) Appl. No.: 17/338,439

(22) Filed: Jun. 3, 2021

(65) Prior Publication Data

US 2021/0381910 A1  Dec. 9, 2021

(30) Foreign Application Priority Data

Jun. 4, 2020  (DE) .......................... 102020114901.8

(51) Int. Cl.

| C03B 37/012 | (2006.01) |
|---|---|
| G01K 13/04 | (2006.01) |
| G01K 1/143 | (2021.01) |
| C03B 35/00 | (2006.01) |
| C03B 5/00 | (2006.01) |
| C03B 37/027 | (2006.01) |

(Continued)

(52) U.S. Cl.
CPC ............. G01K 13/04 (2013.01); C03B 5/005 (2013.01); C03B 35/00 (2013.01); G01K 1/143 (2013.01); *G01K 2007/422* (2013.01)

(58) Field of Classification Search
CPC ........ B29C 48/92; B29C 49/78; G01K 13/04; G01K 2007/422; G01K 1/143
See application file for complete search history.

(56) References Cited

U.S. PATENT DOCUMENTS

| 4,148,223 A | * | 4/1979 | Disinski | ................. | G01K 1/143 |
| | | | | | 374/E1.019 |
| 4,226,607 A | * | 10/1980 | Domken | ............... | C03B 33/085 |
| | | | | | 65/109 |

(Continued)

FOREIGN PATENT DOCUMENTS

| CH | 638 761 A5 | 10/1983 | | |
| DE | 69821839 T2 | * 1/2005 | ............. | G01G 15/00 |

(Continued)

OTHER PUBLICATIONS

Parker Hannifin Corporation (2020) MicroStrain Sensing Product Datasheet, Document 8400-0125 Revision D.

*Primary Examiner* — Galen H Hauth
*Assistant Examiner* — Steven S Lee
(74) *Attorney, Agent, or Firm* — Leydig, Voit & Mayer, Ltd.

(57) ABSTRACT

Test dummy for detecting at least one process variable in the manufacture of glassware of identical or similar design along a production line, comprising a base body which is adapted to the shape and/or dimension of the glassware in such a manner that it can pass through the production line instead of a glassware, at least one sensor system mounted on the base body for detecting the at least one process variable on the base body, and at least one transmission apparatus mounted on the base body for transmitting the at least one detected process variable to a digital receiving unit.

8 Claims, 4 Drawing Sheets

(51) Int. Cl.
  *C03B 37/03*     (2006.01)
  *G01K 7/01*      (2006.01)
  *G01K 7/42*      (2006.01)

(56) References Cited

U.S. PATENT DOCUMENTS

| | | | |
|---|---|---|---|
| 10,494,288 B2 | 12/2019 | Hunzinger et al. | |
| 2004/0226392 A1* | 11/2004 | McNally | G01D 21/02 |
| | | | 702/189 |
| 2011/0175246 A1* | 7/2011 | Winzinger | B29C 48/92 |
| | | | 425/170 |
| 2015/0081233 A1* | 3/2015 | An | G01M 15/12 |
| | | | 702/56 |
| 2015/0301521 A1* | 10/2015 | Byron | G05B 19/4183 |
| | | | 700/108 |

FOREIGN PATENT DOCUMENTS

| | | | | |
|---|---|---|---|---|
| DE | 102008020765 B4 * | 8/2012 | | G01K 11/24 |
| DE | 102012112323 B3 | 1/2014 | | |
| DE | 102014102203 A1 * | 8/2015 | | B29C 49/4205 |
| EP | 3249489 A1 * | 11/2017 | | F24F 11/30 |
| EP | 3275846 A1 | 1/2018 | | |
| WO | WO-2009123273 A1 * | 10/2009 | | B21B 38/006 |
| WO | WO-2011095566 A1 * | 8/2011 | | B01J 8/067 |
| WO | WO-2013005063 A1 * | 1/2013 | | B29C 53/60 |
| WO | WO-2016074790 A1 * | 5/2016 | | B29C 49/36 |
| WO | WO-2018078636 A1 * | 5/2018 | | G01K 1/143 |

* cited by examiner

DUMMY FOR MONITORING THE MOLDING PROCESS

CROSS-REFERENCE TO RELATED APPLICATIONS

This application claims the benefit of German Application No. 10 2020 114 901.8, filed Jun. 4, 2020, which is hereby incorporated by reference in its entirety.

BACKGROUND OF THE INVENTION

The development generally relates to the mass production of glass containers for the pharmaceutical industry, such as glass syringe bodies, glass ampules, glass cartridges or glass vials, from glass tube blanks, in a production line.

In particular, the development concerns the detection of process variables along the production line, especially the glass surface temperature. With the aid of these detected process variables, deviations in the process control or machine adjustment are to be concluded in order to enable targeted, time- and cost-saving troubleshooting along the production line.

Such production lines target the manufacture of glassware of identical or similar design. Process parameters as well as portions, modules or tools of the production line can vary. In addition, a wide variety of starting materials can also vary within a range, which are still receivable and processable by the production line. Processing in the sense of the invention relates to all steps for the manufacture of the glassware, i.e., picking up, moving, changing, in particular heating and/or deforming, sensory detecting, testing or also removing the glassware along the production line. The identical or similar design of the glassware comes about in particular by using the same initial workpieces, passing through identical process conditions of the initial workpieces or also maintaining the constructive configurations of the production line.

Generic production lines comprise rotary machines for introducing a desired contour into glassware. The contour is understood to be the geometry of the surface, in particular the outer surface, in the longitudinal direction, in particular at a determined position in the circumferential direction. Typically, commercially available special glass semi-finished products, in particular glass tube portions, are used as initial glassware. The semi-finished products are brought to a processing temperature (viscosity $\eta=4.0$ dPa·s) at heating stations and then formed sectionally at forming stations. For this purpose, glass tubes are clamped in receptacles, in particular individual rotationally mounted chucks, of a rotary machine roundel in the rear to middle tube area from the outside in the chucks under force and guided in close succession of the receptacles through various glass processing stations, in particular the heating and forming stations. The glass bodies rotating about the longitudinal axis are selectively heated at the heating stations in the front portion (glass tip') by means of a gas burner flame, and shoulder, cone, necking-in or end geometries are introduced sectionally at the forming stations by means of laterally and/or internally engaging forming tools. Heating and forming stations can also be integrated in a common processing station.

The glassware is thus processed one after the other and/or in parallel along the production line and moved between the stations by a conveying apparatus, such as a material flow system, for example by means of the receptacles. If a receptacle is associated with exactly one glassware, it is referred to as a single receptacle. Within these single receptacles, the workpieces are moved to the processing stations clocked in time and subjected to predefined process influencing variables within these stations. The glassware is fed to a processing in such a manner that the glassware of identical or similar design is provided at the end of the production line, in particular products for the pharmaceutical industry, which must be within predefined manufacturing tolerances, also in order to meet any quality requirements for the sale of such products.

After processing, the transformed hollow body is usually geometrically measured, supported by camera technology, and examined for defects, such as cracks in the glass. Based on experience, process or machine parameters are readjusted by hand if increased scrap is registered as a result of systematic geometric deviations or defects in the end products. Manufacturing-related causes of shape deviations or damage to the glass end product depend on various influencing variables of the manufacturing process.

The glass-specific processing temperatures are usually between 1000 and 1500° C.; on the process side, a tolerance area of 10° C. is usual for precise forming. Deviations from a predefined glass temperature due to inaccurate burner flame exposure are the main cause of quality fluctuations or deviations. Deviations in glass temperature can be caused by unstable process control variables (e.g., fuel gas composition, gas mixing ratio, flame distance, exposure times of the glass) or process conditions (e.g., fluctuating ambient temperature, drafts at the flame). Other sources of error can also be production line-related or operator-caused, for example the use of incorrectly configured gas burners or production intolerances and contamination on the gas burner.

Similarly, depending on the process principle, other process parameters, for example the accuracy of a forming force or a feed position of the forming tools, also have a relevant influence on the quality of the glass products and the variability of manufactured glass products over time. In this respect, in addition to the processing temperature, other process variables must also be taken into account for quality assurance or for targeted troubleshooting.

In the case of experience-based readjustment of the production line, it is unclear whether the corrections have been successful until the first glassware produced after recommissioning is tested. This entails start-up costs and, if necessary, renewed downtime of the production line. Furthermore, in the case of exclusive final inspection, quality deviations are only detected after the line has been completely run through. This may result in the scrap of all partially processed glass tubes that have already passed through the faulty (partial) process and are still in the production line. In addition, the quality and geometries of the glass products are often batch-dependent, since the adjustment or configuration of the production line is hardly reproducible.

Identifying the source of error according to the trial-and-error principle on the basis of quality information from the final inspection customary in the industry is therefore time-consuming, material- and personnel-intensive, and is also associated with sometimes high production line downtimes.

US'453 discloses a rotary table machine for the manufacture of generic glass containers, which is equipped with a thermal imaging camera attached to the rotary table machine's roundel and which is used to detect glass surface temperature measurements and control process parameters such as firing gas composition.

However, a thermal imaging camera permanently installed in the production line with respect to a glassware passing through the rotary table machine is not very flexible to use, for example for multiple measurements at different positions or with respect to different glassware along the production line, and is also electronically complex and cost-intensive to implement.

Since the thermal imaging camera of US'453 is also fixed to a particular glass cylinder held by clamping jaws on the rotary table machine's roundel, various tests at the processing stations or test runs of glass tubes through the entire machine are necessary in the event of troubleshooting, for which a plurality of non-distributable glass samples are again consumed, while the production line is also not usable for production.

In addition, changing environmental conditions lead to different measurement results for thermal imaging cameras. Comparable measurement surveys are therefore not ensured and effective error search or efficient troubleshooting is still not possible. All in all, there is no reference that can detect an absolute deviation from the nominal value and from which the measurement of readjustment can be reliably derived. Since thermal imaging camera measurements are error-prone with respect to different environmental conditions, the risk of scrap increases.

BRIEF SUMMARY OF THE INVENTION

The aim of the present development is to overcome the disadvantages of the state of the art, in particular to provide a testing instrument which reliably detects process variables along the production line, preferably surface temperatures on or in the glass passing through the production line, can be used flexibly and allows derivations to be made about the manufacturing process of the glass containers in order to quickly identify sources of error which lead to quality deviations in the glass products and to remedy them in a targeted manner.

In particular, fewer scraps are to be produced as a result of an inaccurate or faulty adjusted production line or due to deviations of the process variables of the production line from the predefined process window during the manufacturing process, and production downtimes are to be minimized.

This object is achieved by the subject matter of the independent claims.

Accordingly, a test dummy is provided for detecting at least one process variable in the manufacture of glassware of identical or similar design along a production line. In general, any physical variables or also derived variables of the manufacturing process can be considered as process variables. Physical variables of the production process can, for example, relate to the ambient conditions in the production line, such as ambient temperature, process temperatures, atmospheric pressure, thermal radiation intensities, or similar. Furthermore, process variables can concern direct process influencing variables, in particular the surface temperature on the glassware, but furthermore also, for example, the fuel gas composition, fuel gas flow, force application of forming tools on the glassware, the spacing of parts of the production line, for example the burner or the forming tools from the glassware, or the like. In addition, the process variables to be detected can also depict chemical variables, such as the element composition. Derived process variables can be qualitative as well as quantitative variables, which are determined from several physical and/or chemical variables, for example the heating rate of a workpiece in the production line, the temperature profile along the production line or the like, as well as quality parameters, such as dimensional accuracy, positional accuracy, or also a variable which would lead to the scrap of a workpiece. In this respect, it is clear that the at least one process variable can be both dimensional and dimensionless, and that the numerical value can encompass a wide variety of numerical spaces, for example natural numbers, real numbers, or even the binary value region.

The test dummy according to the development comprises a base body which is adapted to the shape and/or dimensions of the glassware in such a manner that it can pass through the production line instead of a glassware. In particular, the test dummy can be adapted in shape and/or dimensions to the glassware semi-finished product. The base body can also be adapted in shape at least sectionally to the outer and/or inner contour of the glassware, for example having shoulder, cone, necking-in or end geometries of the glassware at least sectionally, in particular to a lesser extent than those introduced in the glassware. Furthermore, or alternatively, the base body can be adapted with respect to the dimensions in such a manner that an at least sectional, in particular maximum and/or minimum longitudinal extension and/or transverse extension of the glassware is not exceeded or falls below. In particular, the base body is adapted to the shape and/or dimensions of the glassware in such a manner that it can be received by the conveying apparatus of the production line, in particular by receptacles of the production line, for the glassware and/or the base body can move along the production line damage-free. The contour of the base body of the test dummy can therefore be shaped according to at least one defined contour of the glassware along the production line. Adapting the contour of the base body of the test dummy with respect to the shape and/or dimensions of the glassware thus serves the most accurate possible reproduction of the process conditions on a glassware along the production line. This is achieved in particular by geometrically approximating the test body to the defined contour of the glassware. In this respect, specific distances between components of the production line and the glassware or defined locations on the surface or along the surface in the longitudinal direction and/or in the circumferential direction of the glassware are also mapped accordingly in the shape and/or dimensions of the test body.

The test dummy further comprises at least one sensor system attached to the base body for detecting the at least one process variable on the base body. It should be understood that the sensor system comprises any type of electronic components, in particular interconnected electronic components, which are used for detecting the at least one process variable. In particular, the sensor system may comprise both passive and active electronics, in particular for generating an electronic signal, in particular from a surface temperature of the base body, in particular by means of temperature sensing sensors. Furthermore, the sensor system may include electrical coupling of the electronic components for detecting the at least one process variable, for example, line cables for power coupling and/or signal coupling, and/or other sending or receiving apparatuses. It should be understood that the electronic components can also be designed in such a manner that the electronic signals can be partially processed, in particular converted, etc., for example the sensor system comprises an electronic signal amplification and/or attenuation, a digital-to-analog converter or other, whereby parts of the sensor system can also fulfill functions that deviate from the detection of the at least one process variable in the narrower sense.

The sensor system can be attached to the base body from the outside, but can also be attached to the base body in any other form, for example in the form of attaching submodules to and/or in the base body, introducing sensor systems into cavities, grooves or recesses in the base body, functionalizing the surface of the base body, or also fastening the sensor system to the base body by notoriously known fastening means. The fastening means may include mechanical fastening means, such as screws, rivets, press fits or the like, as well as chemical connection technologies, such as bonding, sintering or other joining methods.

It should further be understood that the sensor system introduced into the base body must be interpreted in such a manner that the at least one process variable can be detected by the sensor system. With regard to the detection of the surface temperatures, temperature sensors introduced close to the surface are particularly suitable. Appropriate pressure sensors can be used for the detection of the force applications to the surface of the test body.

The test dummy comprises furthermore at least one transmission apparatus attached to the base body for transmitting, in particular forwarding, the at least one detected process variable to a digital receiving unit. The transmission apparatus can be attached to the base body in the same manner as the sensor system or in a different manner. The transmitting of the at least one detected process variable to the digital receiving unit comprises in particular the transmitting of electronic signals of the sensor system.

In a preferred embodiment of the invention, the base body is rotationally symmetrical with respect to the longitudinal axis. In particular, the radial distance, i.e., the distance from the central axis to the surface perpendicular to the central axis, of the surface, in particular the outer surface, of the base body may be constant with respect to a position along the longitudinal axis in the circumferential direction. It should be understood that different points, in particular portions along the longitudinal axis of the base body may have different constant radial distances. In the longitudinal direction, the contour of the base body runs in particular without jumps or, in other words, smoothly. In particular, the contour of the base body can be uniformly shaped in the circumferential direction, wherein any shoulder, cone, necking-in or end geometries in the contour of the base body can also be rotationally symmetrically shaped. Furthermore, the base body can be cylindrical at least sectionally in the longitudinal direction, i.e., the surface of the base body, in particular the outer surface of the base body, has the same radial distance in the circumferential direction at least in one portion at each position of the at least one portion in the longitudinal direction. During rotation about the central axis, the base body therefore has a constant distance between the surface and a part of the production line, for example a burner or forming tools, in the at least one portion. The base body can be shaped both cylindrically along its entire longitudinal extension, in particular with constant radial distance along its entire longitudinal extension, or have several rotationally symmetrical portions, in particular cylindrical portions, wherein adjacent portions with different radial distances merge in particular smoothly into one another.

Furthermore, the base body may have a greater longitudinal extension than a maximum radial distance, at least sectionally. The longitudinal extension of the base body is thereby preferably smaller than 200 mm, 150 mm, 100 mm and larger than 5 mm, 10 mm, 20 mm. The base body can have, at least sectionally a maximum radial extension, in particular in a receptacle portion, smaller than 15 mm, 12 mm, 10 mm, 8 mm or 6 mm.

In particular, the contour of the base body corresponds substantially to the contour of the glassware for at least one time portion of movement along the production line. In particular, the contour of the base body can correspond sectionally to the longitudinal extension and/or the in particular maximum radial extension of the glassware in the at least one time portion.

In particular, the contour of the base body substantially corresponds to the contour of the glassware corresponding to at least one time section immediately before, during, and/or after at least partial processing of the glassware along the production line. During the at least one time portion, the glass body can assume at least one defined contour along the production line, in particular before, during a contour invariant processing, such as heating processing, during, or after processing in the at least one predefined section of the production line. Within processing stations, the glassware can be brought from a first defined contour of the glassware to a second defined contour of the glassware. The first defined contour, for example before processing of the glassware along the production line, is thus usually different from the contour of a second temporary state of the glassware, for example after processing of the glassware. It should be understood that the defined contours of the glassware depend on the process conditions, mechanical configurations, and/or environmental conditions of the production line, and thus the contours of the glassware may vary in accordance therewith. Shape deviations are usually detected based on such defined contours of the glass body. The at least one time portion, in particular at least one time portion before and/or after at least partial processing, can be assigned to at least one predefined portion of the production line, in particular the one predefined processing section for glassware before, within or after heating stations and/or forming stations. It should be understood that the glassware comprises the processing portions, in particular processing portions within heating stations and/or forming stations, generally arranged one after the other along the production line, preferably within the rotary indexing tables.

In particular, the at least one time portion during an at least partial processing of the glassware comprises a time portion of a heating processing of the glassware, wherein the at least one time portion during a processing in particular does not involve a change of the contour of the glassware, both with respect to the longitudinal extension and with respect to the in particular maximum radial extension.

As previously described, the movement of the glassware clamped in the receptacles through the production line is generally clocked in time. The at least one time portion refers in particular to a time portion of the clock in which the contour of the glassware remains substantially unchanged, whereby the base body can be shaped in correspondence with a defined contour of the glassware in the at least one time portion.

In a preferred embodiment of the invention, the base body has at least one detecting portion in which the sensor system is introduced, and at least one receptacle portion in which the test dummy can be received by the production line and/or in which the transmission apparatus signal-coupled to the sensor system is accommodated. The at least one detecting portion and/or the at least one receptacle portion preferably extends in the longitudinal direction of the base body, wherein in particular the at least one detecting portion is arranged closer to a detecting portion-side longitudinal end of the base body and the at least one receptacle portion is arranged closer to a receptacle portion-side longitudinal end of the base body. The base body may in particular have several detecting portions and/or several receptacle portions. Furthermore, the at least one detecting portion may have a distance to the at least one receptacle portion, wherein the at least one detecting portion and the at least one receptacle portion are spaced apart from one another, in particular in longitudinal direction. Furthermore, the at least one detecting portion may be spaced from the detecting portion-side longitudinal end of the base body and/or the at least one receptacle portion may be spaced from the receptacle portion-side longitudinal end.

The at least one detecting portion and/or the at least one receptacle portion each form, in the circumferential direction, a detection portion-side edge on the surface of the base body and a receptacle portion-side edge on the surface of the base body. The detecting portion-side edge and/or the receptacle portion-side edge of the detecting portion and/or of the receptacle portion can thereby have a uniform spacing in the circumferential direction from the receptacle portion-side longitudinal end of the base body and/or a detecting portion-side longitudinal end of the base body. The distance of the at least one detecting potion-side edge and/or of the at least one receptacle portion-side edge of the at least one detecting portion and/or of the at least one receptacle portion from the detecting portion-side longitudinal end of the base body and/or from the receptacle portion-side longitudinal end can furthermore be at least sectionally uniform for different radial distances of the surface of the base body. Furthermore, the at least one detecting portion and/or the at least one receptacle portion can have a uniform extension and/or a uniform position in the circumferential direction of the base body. In particular, the at least one detecting portion and/or the at least one receptacle portion may be shaped rotationally symmetrically, in particular with respect to the central axis, in particular cylindrically.

The sensor system introduced in the detecting portion may be introduced close to the surface of the base body. The proximity to the surface of the introduced sensor system relates to the radial distance from at least one measuring point of the sensor system to the surface of the base body. The at least one measuring point corresponds to a limited area of the detecting portion in which the at least one process variable is detected as best as possible by the sensor system on the basis of a predetermined sensor system. The at least one measuring point is determined in particular by the size of the sensing part sensor system, for example a sensing area of a sensor, and/or a position in radial direction, in longitudinal direction and/or in circumferential direction. The at least one measuring point is introduced close to the surface if this has a radial distance of at most 20%, 10% or 5% compared to the radial distance of the surface at the longitudinal position of the measuring point. The introduction of the sensor system close to the surface is intended to allow a small radial distance to the zone of influence of the at least one process variable, in particular the surface temperature, and thus a low response time and a high detection accuracy of the sensor system.

The receptacle portion is used to receive the test dummy from the production line, in particular by clamping means, in particular clamping jaws, holding device and/or fastening apparatus of the production line. The at least one receptacle portion is arranged in the longitudinal direction and/or has a longitudinal extension such that the clamping means, the holding devices and/or the fastening apparatus of the production line act on the at least one receptacle portion in a force-applying manner, in particular they act exclusively in the receptacle portion in a force-applying manner.

The transmission apparatus can also be accommodated in the at least one receptacle portion. The transmission apparatus is preferably arranged on the receptacle portion-side edge of the base body. The arrangement of the receptacle portion or the transmission apparatus along the base body serves to distance it from the detecting portion, in particular to protect electronic components of the transmission apparatus. The signal technical coupling of the sensor system with the transmission apparatus can preferably be provided in areas of the base body remote from the surface, in particular close to the central axis, to protect the electronic coupling and the interference-free transmitting of the at least one process variable. The signal technical coupling can preferably be an electronic coupling, for example by means of line connections, such as cables, and/or at least one other form of coupling, for example an optical coupling, for optical signal transmission. In this respect, the sensor system may comprise both electrical and optical or other types of detection and/or coupling and/or transmission. In particular, the transmission apparatus may be housed as a separate unit in the receptacle portion, and in particular may comprise materials other than ceramic and/or metallic materials, for example polymers.

The at least one detecting portion may further have a distance to the at least one receptacle portion. The distance of the detecting portion-side edge of the at least one receptacle portion from the receptacle portion-side edge of the at least one detecting portion serves, for example, for insulation, in particular thermal insulation, of the detecting portion exposed to at least one load source from the receptacle portion. In this respect, the clamping means, holding devices and/or fastening apparatus of the production line engaging the receptacle portion are protected from the process influences by the at least one load source. Such process influences may comprise, for example, temperature influences, pressure influences, radiation, in particular thermal radiation, thermal and/or chemical loads and/or mechanical forces. The at least one load source engaging the at least one detecting portion may in particular be a heating source, in particular at least one burner flame. The at least one load source is arranged in the longitudinal direction in the circumferential direction relative to, in particular at a certain radial distance from and/or in alignment with the measuring point of the sensor system and/or perpendicular to the surface, in particular the outer surface, of the test body to the detecting portion, in particular opposite the surface, in particular the outer surface, of the detecting portion, in particular the at least one measuring point of the sensor system. In the case of a plurality of load sources, these can be arranged spaced apart from one another, in particular uniformly, in the longitudinal direction and/or in the circumferential direction. The at least one load source acting on the at least one detecting portion can thereby also comprise a mechanical load source, for example for force application to the detecting portion, for example in the form of forming tools engaging the test body, or other load sources.

In a preferred further embodiment of the invention, the at least one detecting portion has at least one measurement area that accommodates at least a part of the sensor system. The at least one measuring portion can in particular have a uniform extension in the longitudinal, radial and/or circumferential direction, in particular be rotationally symmetrical, in particular be cylindrically shaped. In particular, at least a part of the measurement areas, in particular all measurement areas, may be shaped in the same manner.

The at least one detecting portion may further comprise a first measurement area and a second measurement area, in particular adjacent to the first measurement area, wherein the first measuring portion and the second measurement area are separated and/or interrupted and/or isolated and/or decoupled from one another. The first measurement area and the second measurement area can in particular be separated in such a manner that a detection of the at least one process variable in the first measurement area can be carried out independently of a detection in the second measurement area. The separation refers in particular to a local demarcation of the first measurement area from the second measurement area, in particular a spacing of detection portion-side edges or receptacle portion-side edges of a first measurement area from an adjacent receptacle portion-side edge or detection portion-side edge of the second measurement area. In particular, the first measurement area can be interrupted by the second measurement area on the material side. Furthermore, the first measurement area can be isolated from the second measurement area with respect to the influencing variables on the detection area, in particular thermally isolated, force isolated and/or position isolated, in particular with respect to the further measurement areas and/or portions of the base body. In addition, the first measurement area can be decoupled from the second measurement area in such a manner that an effect, for example, a heat transfer effect or a force effect, of the process influences or loads on the at least one detection area in the first measurement area is transmitted little or substantially not to the second measurement area. This serves in particular the spatial resolution of ambient conditions in longitudinal direction and/or in circumferential direction. In this respect, the first measurement area in particular has a different part of the sensor system than the second measurement area.

Furthermore, the at least one measurement area may comprise at least one part of the sensor system. The at least one part of the sensor system may be arranged in the longitudinal direction and/or in the circumferential direction of the respective measurement area. In particular, the at least one measuring point of the sensor system may comprise the at least one part of the sensor system. The at least one part of the sensor system may be unambiguously, in particular uniquely, associated with the at least one measurement area. The at least one measuring point can in particular comprise exactly one part of the sensor system, in particular exactly one sensor, in particular measuring sensor, in particular temperature sensor.

The at least one measuring point with the at least one part of the sensor system can in particular be arranged at a defined distance from the detection portion-side edge of the at least one measurement area and/or from the receptacle portion-side edge of the at least one measurement area. In particular, the at least one measuring point in the at least one measurement area can be arranged substantially in the same manner with respect to the position relative to the base body at least in part of the measurement areas of the detecting portion, in particular all of the at least one measurement area. The at least one measuring point with the at least one part of the sensor system can in particular be arranged at the same minimum distance from the detection portion-side edge of the at least one measurement area and/or from the receptacle portion-side edge of the at least one measurement area, in particular be arranged centrally in the longitudinal direction and/or uniformly spaced in the circumferential direction with respect to the at least one measuring portion.

Different measuring points of the sensor system can also be combined to form parts of the sensor system in terms of signal technology, in particular coupled or connected in terms of signal technology. Such an interconnection of measuring points or parts of the sensor system can, depending on the type of interconnection, in series or in a row, serve for an amplification of the measuring signal of the at least one process variable or for an averaging of measuring signals in order to vary, in particular to adapt, in particular to optimize the measuring accuracy or the signal-to-noise ratio or the inertia of the detection of measuring signals.

In a preferred embodiment of the invention, the test body behaves invariantly along the production line with respect to at least a part of process conditions of the production line. Process conditions in this case comprise at least the at least one process variable as well as all influencing variables on the at least one process variable. In particular, this includes the previously outlined scope of process variables. Preferably, the at least one part of the process conditions of the production line comprises a surface temperature at the test body, wherein this may in particular comprise the near-surface area of the detection area. The surface temperature is influenced, in particular adjusted, by heating the test body, in particular in a heating station, in particular by a burner or by a heating lamp or by another object for heat transfer. In particular, the base body behaves substantially invariant with respect to at least part of the process conditions in the detection area, since this area is most subject to the process conditions. In particular, the surface temperatures on the test body, especially in the region of the sensor system, should not exceed a limit value, in particular a limit value of the surface temperature of 100°, 200°, 300°, 400° or 500°. The aim of the at least sectional invariance of the base body with respect to at least one part of the process conditions is to ensure that the base body is not changed in its material properties, in particular not damaged, by exposure to the process conditions. In particular, the sensor system is not to be damaged by the process conditions. According to the invention, the test body can thus be used several times for the purpose of the detection of the at least one process variable or different process variables. The invariance of the base body at least sectionally is intended to ensure that substantially the same determined values of the process variables are also determined when the test body is repeatedly run through the production line under the same process conditions. The multiple use of the test body also avoids unnecessary scrap. Furthermore, the test body thus depicts a reference measuring body for a wide variety of process conditions or a wide variety of mechanical configurations of the production line.

In a preferred embodiment, the base body has, in particular, sectionally ceramic and/or metallic materials. These materials of the base body are used for the purpose of at least sectionally invariance of the base body, i.e., in particular with respect to at least sectional invariance up to the limit value, preferably the limit value of the surface temperature. In this context, ceramic materials and refractory metallic materials are characterized by special temperature resistance. Compared with ceramic materials, metallic materials also have the advantage of better mechanical workability, by ways of example better machinability. Here, the shape and dimensions of the base body can be realized by widely used and highly efficient shaping machine tools. The advantage of ceramic materials lies in their naturally higher temperature resistance compared to metallic materials. It should be made clear that the manufacture of the base body is not limited by any of the production methods mentioned for ceramic and/or metallic materials, in particular with regard to their shape and dimensions. Metallic materials also have the advantage over ceramic materials of high thermal conductivity, which results in a low response time for correspondingly introduced sensor systems. High thermal conductivity enables rapid, uniform heating of the material portion at constant energy input, which leads to rapid setting of an equilibrium temperature. This also allows measuring points to be arranged at a greater distance from one another and minimizes the number of measuring points required.

In a preferred embodiment of the invention, the transmission apparatus may comprise an electronic control that at least partially processes, for example stores and/or analyzes and/or converts and/or evaluates the at least one process variable detected by the sensor system. In this context, the electronic control may comprise a microcontroller or another type of integrated circuit, in the most general case of a logical interconnection of electronic components, which is capable to receive the detected process variable and to transmit the corresponding measurement signal in an at least partially modified form. The modification, that is, processing can be realized, for example, in a physical memory of the electronic control, and/or in a signal analysis, for example, of a high-pass or low-pass filter, and/or in a conversion, for example, of an analog signal into a digital signal or vice versa, and/or in an evaluation, for example, an interpretation of the signal value in an instruction to the production line or to a user. Furthermore, the transmitting of the at least one process variable detected by the sensor system may be at least partially wireless, for example by wireless power transmission, preferably between the transmission apparatus and the detection unit.

Another aspect of the invention relates to a method for detecting at least one process variable in the manufacture of glassware of identical or similar design along a production line. In the method, at least one test dummy is adapted to the glassware with respect to shape and dimension. Furthermore, the at least one test dummy is integrated into the production line to run through it instead of a glassware. Furthermore, the at least one process variable of the production line is detected on the at least one test dummy. The at least one test dummy may be formed at least partially in particular in accordance with the preceding descriptions.

In a particular embodiment of the invention, the method furthermore comprises the at least one process control being at least partially processed, for example stored and/or analyzed and/or converted and/or evaluated. Furthermore, a transmission of at least the one process variable can subsequently take place at a detection unit of the production line. In particular, the transmitting can take place wirelessly. The at least one process variable can in particular be partially processed. The at least one process variable is preferably processed in such a manner that the process conditions along the production line are changed on the basis of the processing results, in particular with regard to an optimization of the at least one process variable. The processing results relate in particular to the results of the evaluation or analysis of the at least one process variable. The processing can be carried out in accordance with the preceding description by means of the sensor system, the transmission unit and/or the electronic control of the test dummy. The processing can also take place at a unit, for example a receiving unit of the production line or control of the production line, to which the test dummy or the transmission apparatus transmits the at least one process variable. The process conditions along the production line may thereby, in particular, comprise a change in the spacing of mechanical components of the production line from one another, the process conditions per se described above, or also derived variables or quality variables of the production line. The processing concerns in particular an optimization of the process conditions, in particular of the at least one process variable. In particular, the optimization is performed on the basis of a known or to be determined functional relationship between the at least one process variable and the process conditions. The optimization then preferably relates to a minimization or maximization of the effect with respect to the at least one process variable. This can relate in particular to the production-related cause deviation or damage to the glass end product, for example process control variables such as the burner gas composition, gas mixing ratio, flame distance, flame position, or also burner-specific parameters, for example the distance between burner flames or their general arrangement around the glassware or also batch-dependent reference variables of the glass or the forming station or burner itself. In this respect, the variability of the process conditions over time is to be reduced, in particular with regard to the surface temperature of the glassware or of the at least one test dummy over time and/or with regard to its surface profile, or optimized with respect to nominal values.

In accordance with a further embodiment, the at least one test dummy passes through the production line below limit values of the process conditions of the production line. Such limit values are selected such that they do not exceed a surface temperature, in particular, at least at a detecting portion section of the at least one test dummy. In particular, the surface temperature does not exceed a limit value of approximately 100°, 200°, 300°, 400° or 500° at least at a portion of the at least one test dummy, in particular so that rapid detection of the at least one process variable can be achieved, whereby a reduction in the duration of error identification or of the failure of the production line can be achieved. Furthermore, the at least one test dummy, in particular the sensor system, is thus not damaged and can be used several times.

In accordance with a further embodiment, the at least one test dummy passes through the production line only partially. Preferably, the at least one test dummy passes through at least one predefined portion of the production line, in particular the predefined processing portion for glassware before, within or after heating stations and/or forming stations. Preferably, the at least one test dummy is integrated into the production line exclusively in the at least one predefined portion of the production line. In particular, the at least one test dummy can be introduced at points or at time portions of a processing, in particular of a heating of the surface of the glassware or of the at least one test dummy, so that the at least one test dummy is integrated into the production line only for the duration of the detection of the at least one process variable in the production line. In this respect, the at least one test dummy can run through the production line continuously and completely, or it can run through only certain subportions of the production line, in particular those subportions in which the causes of shape deviations or damage to the final glass product are suspected. In particular, the test body can pass through a forming or heating station or a succession of these several times, especially one after the other, or it can also skip various portions of the production line. This enables a targeted search for causes of shape deviations or damage without producing any glass scrap for this purpose.

In accordance with a further embodiment, the method further comprises a correlation relationship between the at least one process variable, which was preferably detected within the portion and/or preferably below the limit values of the process condition of the production line, and a correspondence of the at least one process variable during the manufacture of the glassware, in a time portion of the movement, in particular in such a manner that from the at least one process variable at the test dummy it is possible to conclude a respective correspondence of the at least one process variable during the manufacture of the glassware. In particular, the time portion of the movement may concern a time section immediately before, during or after an at least partial processing of the glassware within the at least one portion of the production line. Furthermore, the conclusion may preferably occur prior to transmitting the at least one process variable, preferably processed at least partially in accordance with the way described above, to the detection unit of the production line. In particular, the correlation relationship may be expressed by a functional connection, for example by a proportionality factor or a ratio. In this respect, it is possible in particular to draw conclusions from the surface temperature of the test dummy passing through the forming stations or heating stations to the process conditions during the processing of the glassware at the same forming station and/or heating station. The test dummy is thereby subjected to similar, in particular equivalent, process conditions as the glassware, in particular the exposure temperature of the test dummy is below the processing temperature of the glassware. The correlation relationship thus establishes the correspondence between the process conditions during the processing of the glassware with the process conditions during the detection of the at least one process variable on the test body. In particular, the conclusion can be made by the electronic control of the test dummy or a detection unit as part of the production line. The electronic control of the test dummy can thus complete the closure without having to resort to the control of the production line. This allows the dummy test unit to be used independently of a particular production line.

Furthermore, the invention relates to a production line for manufacturing glassware of identical or similar design, comprising at least one receptacle for at least one glassware passing through the production line, a conveying apparatus for moving the at least one receptacle along the conveying line, at least one test dummy adapted in shape and dimension to the glassware and arranged on one of the at least one receptacle instead of the glassware, and at least one sensor system for detecting at least one process variable on the at least one test dummy. The test dummy can be designed in particular in accordance with the above embodiments. In particular, the production line can carry out one of the methods in accordance with the above embodiments.

The receptacles in this case relate to chucking means, fastening means or receptacle means for integrating the glassware or the test dummy into the production line, in particular for moving it to or from the processing stations, by means of the conveying apparatus. The at least one test dummy may in particular comprise the at least one sensor system.

In accordance with a further embodiment of the production line, the production line further comprises at least one predefined portion, in particular a predefined processing portion for glassware before, within or after heating stations or forming stations, within which the at least one process variable is detected. In accordance with a further embodiment of the production line, the production line further comprises a receiving unit to which the at least one process variable, in particular at least partially processed in accordance with the previous embodiments, is forwarded, in particular wirelessly.

In accordance with a further embodiment, the production line comprises at least one control system that controls the passing through of the glassware and/or the test dummy. In particular, this may relate to the above-described limitation of the process conditions to which the test dummy is subject, in particular in the partial portion of the production line.

Further, this may concern the partial passing through the production line, inferring from a process variable on the test dummy to a process variable on the glassware by a correlation relationship as described above.

BRIEF DESCRIPTION OF THE DRAWINGS

Further features, characteristics and advantages of the invention will become apparent by means of a description of preferred embodiments of the invention with reference to the accompanying exemplary drawings, in which.

DETAILED DESCRIPTION OF THE INVENTION

Figure 1:
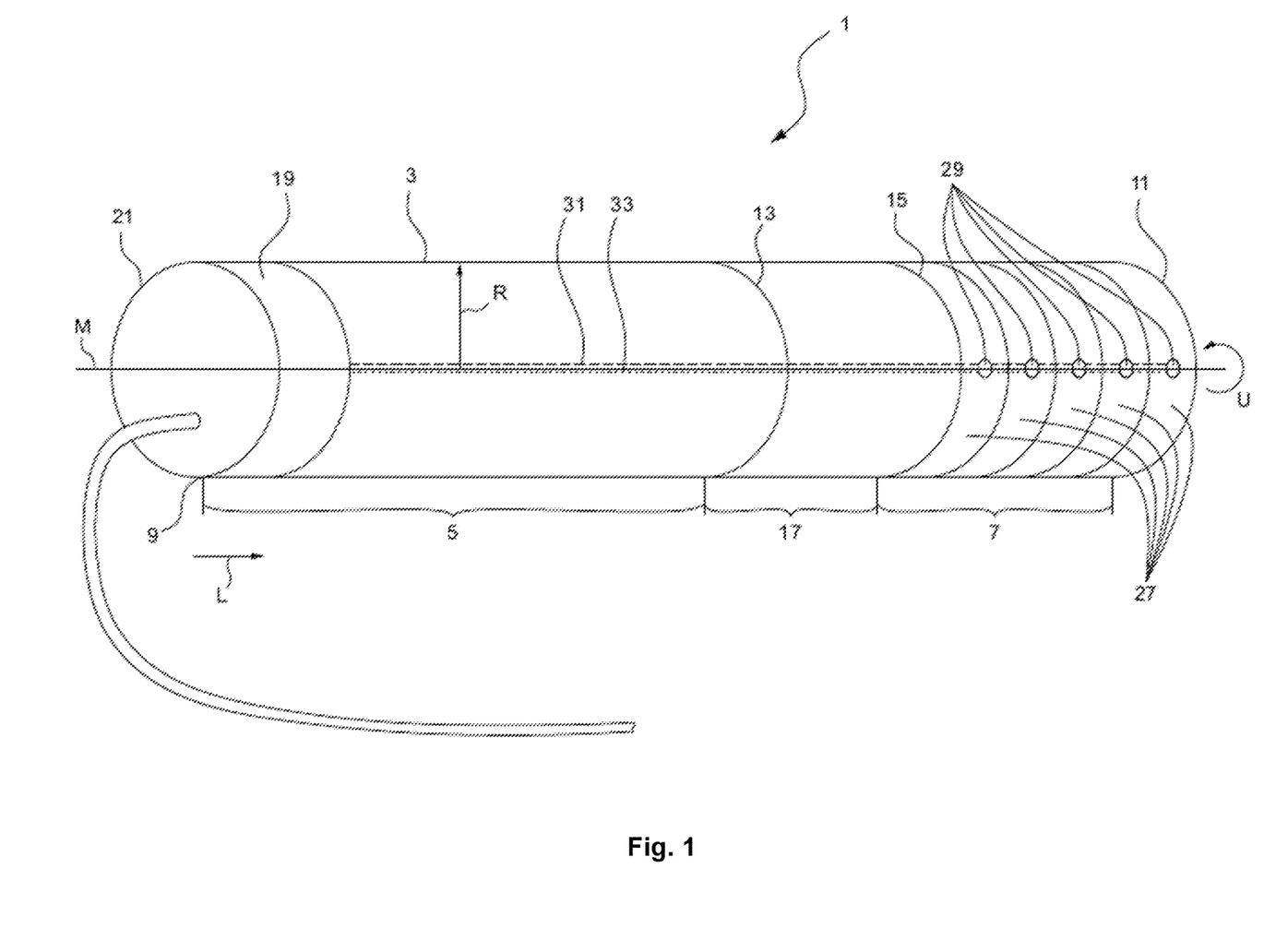
FIG. 1 is a schematic side view of the test dummy in accordance with one embodiment.
Figure 2:
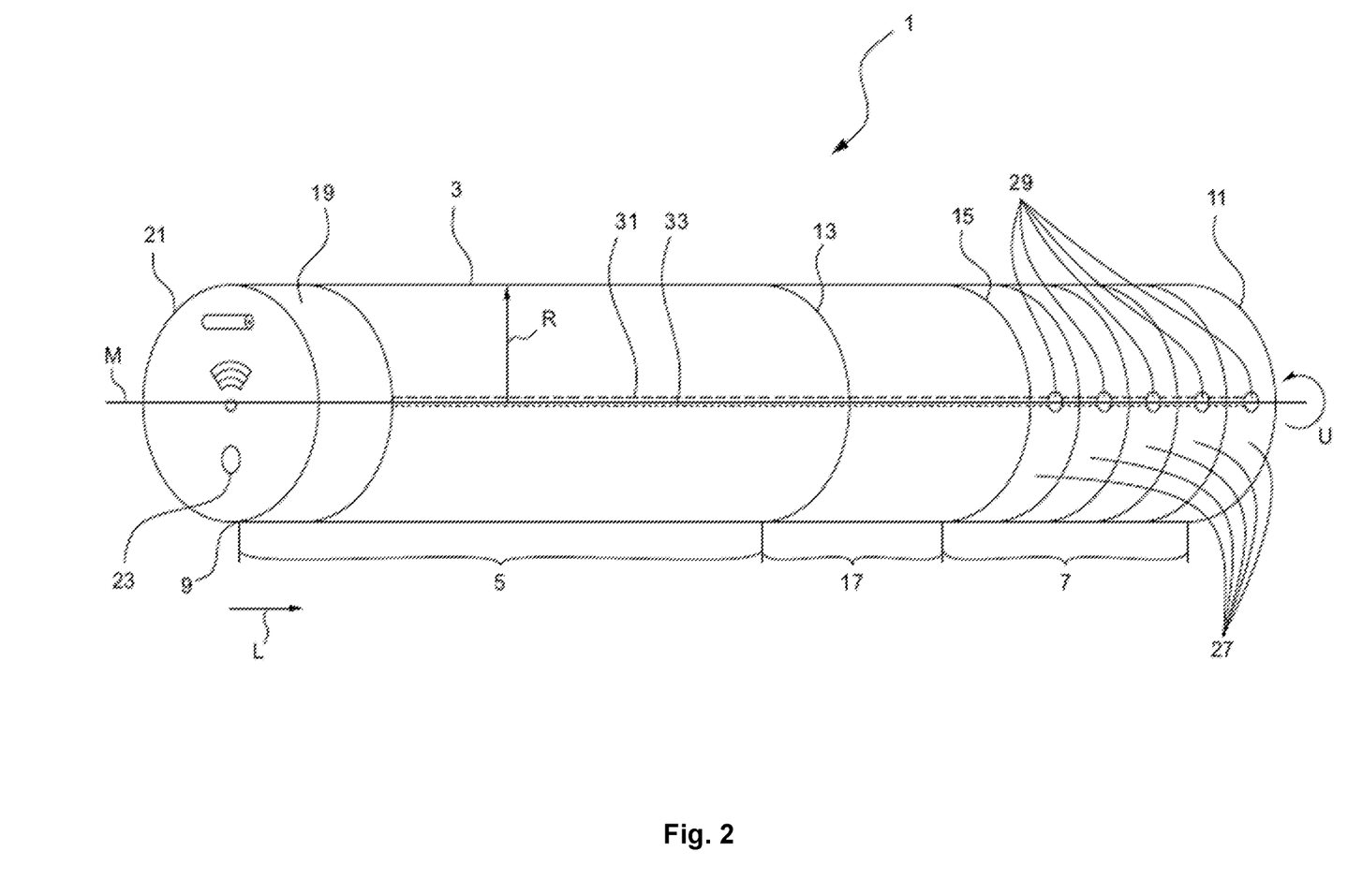
FIG. 2 is a schematic side view of the test dummy in accordance with another embodiment.

FIGS. 1 and 2 each show a test dummy 1 in accordance with the invention. The test dummy 1 has a base body 3 with a cylindrical shape, with a circumferential lateral surface and two opposing circular, flat end surfaces as well as a central axis M extending centrally in the longitudinal direction of the test dummy, which at the same time depicts the symmetry axis of the test dummy cylinder.

The base body 3 has, for example, a longitudinal extension of approximately 80 mm, a typical length of conventionally used glass semi-finished products, glass tubes formed as hollow cylinders, for processing along the production line. Usually, during processing of the glass tube, its longitudinal extension also changes, for example by introducing shoulder, cone or necking geometries by means of forming tools or by cutting to length defined partial portions of the glassware. The extension of the base body 3 in a radial direction, i.e., the diameter of the cylinder is constant over the entire longitudinal extension of the test dummy 1. Usually, the glassware also does not exceed this diameter during processing along the production line. Depending on the glass product to be manufactured, the diameter of the glass semi-finished product, and thus the test body 1 adapted to it in shape and dimensions, can have a diameter of approximately 6 to 15 mm, in particular 6.85 mm to 10.85 mm. It should be understood that for the manufacture of glassware of identical or similar design along the production line, a predefined diameter varies within the production intolerances of the semi-finished product. In this respect, the diameter of the test dummy 1 of FIGS. 1 and 2 is adapted to this predefined diameter of the starting material of the semi-finished glassware. As a result of processing of the glassware, the diameter of the glassware can vary in longitudinal direction L. The course of the radial distance defines a two-dimensional contour, together with the circumferential direction U a three-dimensional contour. In the case of rotationally symmetrical bodies, it is sufficient to consider the wrapping, i.e., the two-dimensional contour. It should be understood that with respect to different glass products with different shapes and dimensions, i.e., contours, different test dummies 1 with correspondingly adapted diameters or contours of the base bodies 3 can also be provided along the production line.

The base body 3 has a receptacle portion 5 extending in the longitudinal direction L and a detecting portion 7. It should be understood that the base body 3 can also have several receptacle sections 5 and detecting portions 7 arranged one behind the other in the longitudinal direction, as well as receptacle portions 5 and detecting portions 7 alternating in the longitudinal direction L within the extension of the base body 3 in the longitudinal direction L. The receptacle portion 5 serves in particular for receiving the test dummy 1 by the clamping means, the holding devices and/or the fastening means of the production line and are arranged in correspondence with the receptacle sections of the glassware on the base body 3 of the test dummy 1. The base body 3 has a receptacle portion-side longitudinal end 9 and a detecting portion-side longitudinal end 11 as end faces. The receptacle portion 5 is arranged at a receptacle portion-side longitudinal end 9 of the base body 3, and the detecting portion 7 is arranged at a detecting portion-side longitudinal end 11 of the base body 3.

A detecting portion-side edge 13 of the receptacle portion 5 may be spaced from a detecting portion-side edge 15 of the detecting portion by an intermediate portion 17. This serves for isolation between the detecting section 7, which is subject to the process conditions, and the receptacle portion 5, which is to be largely uninfluenced by the process influences, so that the test dummy 1 is reliably held in the receptacles of the production line, for example uninfluenced by thermally-induced changes in length of the base body 3, even when the process conditions at the detecting portion change, for example the surface temperature.

The receptacle portion 7 of the base body 3 further comprises the transmission apparatus 19, which is to transmit the at least one process variable to a digital receiving unit of the production line. For this purpose, a connecting cable 23 is connected to the receptacle portion-side end face 21 in FIG. 1. In this respect, the embodiment depicted in FIG. 1 depicts a cable-connected test dummy. FIG. 2 depicts an embodiment of a primarily wireless test dummy 1, in which the receiving unit 19 comprises both a radio transmission apparatus (not depicted), in particular a near-field transmission apparatus, a battery module (not depicted) and a connection socket 25 for optional wired transmitting of the at least one process variable in accordance with FIG. 1.

The detecting portion 9 comprises five measurement areas 27 arranged one behind the other in the longitudinal direction of the base body. Each of the measurement areas 27 has a measuring point 29 in each of which a part of the sensor system, i.e., a measuring sensor, is arranged. The measurement areas 27 are each cylindrical with the same extension in the longitudinal direction and have the same position in the circumferential direction U. Each of the measuring points 29 is arranged within the measurement areas 27 centrally in the longitudinal direction and at the same height relative to one another in the circumferential direction U. Preferably, each of the parts of the sensor system is designed identically, that is, each of the measuring points 29 has the same measuring sensor. Thus, it is to be ensured that an exposure of the measurement areas 27 with identical process conditions leads to an identical measurement signal of the at least one process variable.

For a detection of the surface temperature along the detecting portion 7, the measuring points are embedded in particular in metallic measurement areas 27 with good thermal conductivity. The measuring points 29 thus do not necessarily have to be located in the region of the exposure maximum. Due to the good thermal conductivity of the metallic measuring portion 27, an equilibrium temperature distribution is quickly established over the measurement area in the case of changing process influences.

Each of the measuring portions 27 may be separated from the respective adjacent measuring portion 27 by a thermal insulation layer. In this respect, thermal conduction is limited to one measuring section 27 at a time and each of the measuring portions 27 can thus depict mutually decoupled measurements of the sensor system. By a suitable segmentation of the detection area 7 by measuring portions in longitudinal direction, in circumferential direction and/or in radial direction, a spatial resolution of the process influences on the base body in longitudinal direction, in circumferential direction and/or in radial direction is to be achieved.

In contrast, the receptacle portion 5 and the possibly introduced intermediate portion 17 are characterized by low thermal conductivity, for example by the use of ceramic materials, so that the receptivity of the base body 3 in the receptacle portion 5 is hardly or not at all affected by changing process influences by receptacles of the production line.

It should be understood that the detecting portion 7 can have both a lower number and a higher number of measurement areas 27, as well as the respective measurement areas 27 can have a higher number or also a different number of measuring points 29 per measurement area 27, in particular also a different distribution in the circumferential direction U and/or in the longitudinal direction L. In particular, different parts of the sensor system can also detect different ones of the at least one process variable, for example, a temperature sensor in a measurement area can be adjacent to a pressure sensor in the same measurement area 27.

The measurement sensors introduced in the measurement areas 27 or the detecting portion 7 are connected to the transmission apparatus 19 by means of signal cables 31 and, if necessary, also power supply cables 33, which are preferably introduced in the base body 3 close to the central axis M, i.e., protected from process influences in the detection area 7. In special embodiments, the transmitting of the at least one process variable from the measuring points 29 to the transmission apparatus 19 can also take place wirelessly, for example by optical and/or inductive coupling. To protect the electronic coupling, the ceramic material of the receptacle portion 5 can also extend into the detecting portion 7 in regions of the base body 3 of low radial height R. In this respect, the metallic measurement areas 27 can also be designed as metal rings in which measurement sensors are introduced close to the surface.

Figure 3:
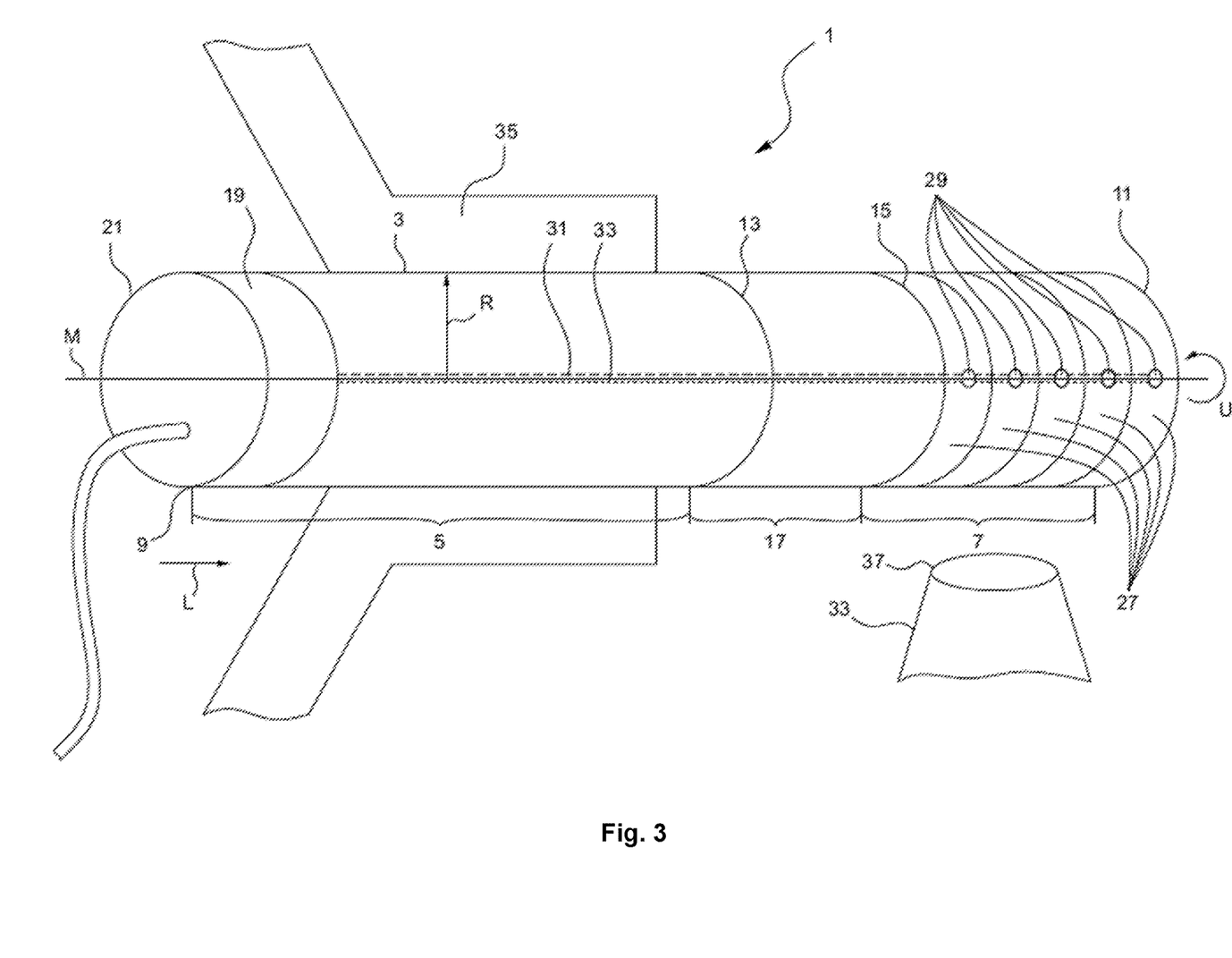
FIG. 3 is a schematic side view of the test dummy in accordance with FIG. 1 in an installed state in a heating station, FIG. 4 schematically depicts a production line in accordance with one embodiment.

FIG. 3 shows the test dummy of the embodiment of FIG. 1 in a state installed in a heating station. The clamping jaws 35 of the production line receptacle lie against the receptacle portion 5 of the base body 3 in such a manner that the clamping jaws are at a certain distance in the receptacle portion-side edge 15 of the detecting portion in the longitudinal direction L, and in particular do not exceed this distance. In particular, the clamping jaws do not protrude into the intermediate portion 17 in the longitudinal direction. In the embodiment of FIG. 3, the clamping jaws 35 are segmented, i.e., they are designed to engage sectionally with the receptacle portion in a force-applying manner in the direction of rotation. Conventional clamping jaw systems have, in particular, three clamping jaws 35 arranged in a star shape and engaging the lateral surface of the receptacle portion 5 in a force-applying manner against the radial direction of the base body.

An outlet opening 37 of a gas burner 39 is associated with the measurement areas 27, from which an ignited gas mixture with a gas outlet pressure and various mutually flowing temperature zones of the gas burner flame emerge during processing operation of the production line. Due to the different spacing of the temperature zones of the gas burner flame to the respective measurement areas 27, the adjacent measurement areas 27 are each heated to a different extent. Due to the heat conduction coupling, the measurement sensors introduced in the respective measurement areas 27 also detect the at least one process variable indirectly, in particular the surface temperature. As a rule, different signal values of the at least one process variable are generated at different measuring points 29 due to the different heating of the measurement areas 27. During the gas flame exposure of the measurement areas 27, the test specimen can additionally be rotated about the center axis by the receptacle comprising the clamping jaws 35, analogously to the processing method for glassware.

Figure 4:
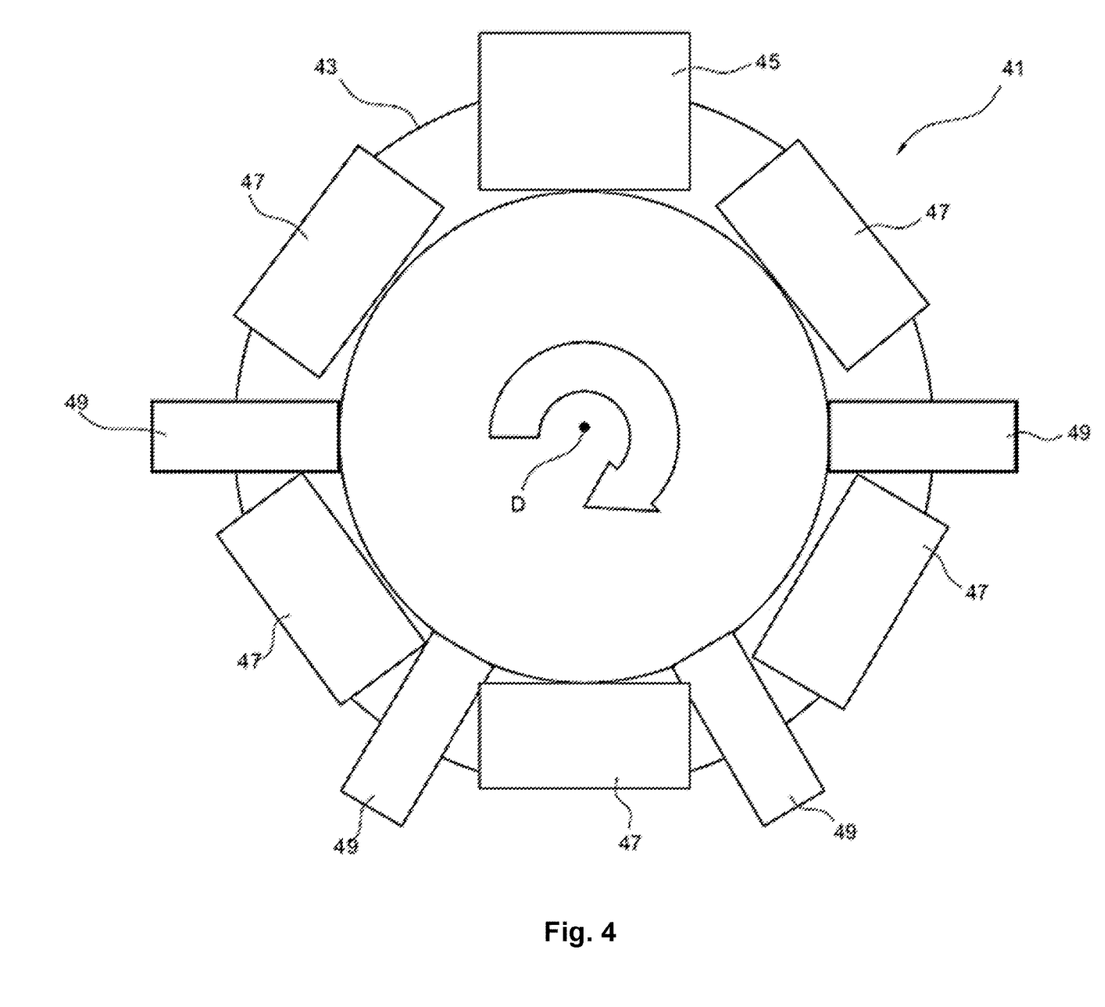

FIG. 4 shows a schematic depiction of a part of the production line 41 in the form of a so-called rotary indexing table. A receiving roundel 43 determines the movement of the receptacles of the production line within the context of the conveying apparatus in a circular movement about the axis of rotation D of the receiving roundel 43, wherein the receptacles, pass through the processing stations arranged at different angular positions of the round table. An input and output unit 45 is arranged at a 12 o'clock angular position, to which heating stations 47 and forming stations 49 are alternately connected as the angular position increases. The input and output unit 45 is used for loading and unloading of glass bodies via receptacles of the production line. In heating stations 47, the portions to be formed are uniformly heated along the longitudinal extension of the glassware by rotating the clamping jaws 35 about the central axis M in the receptacles, and in forming stations 49, a contour deviating from the initial cylindrical shape is introduced into the glassware by forming tools engaging internally in the glassware on the detection portion side or externally on the lateral surface of the glassware. The alternating arrangement of heating stations 47 and forming stations 49 enables complex contours, for example cone, shoulder or necking geometries, to be introduced into the glassware by multi-stage forming of various portions along the longitudinal extension L of the glassware. For quality control purposes, for example with respect to the detection of geometric deviations along the production line, appropriate measuring technology can be introduced between or within the stations. In particular, the input and output unit 45 can comprise an at least random input or output inspection of the glassware with respect to damage such as scratches or cracks in the glass.

The different measurement areas 27 or measuring point 29 each have different distances to the respective temperature zones of the flame of burner 39 or to the forming tools, whereby a spatial resolution is achieved. For a realistic representation of the actual machining conditions, different contours of test bodies 1 can further be provided. It should be understood that different contours of test bodies 1 usually cannot be covered by the same test body 1. Rather, different test pieces 1 with different contours, in particular with respect to a contour in detecting portion 7, can be used for different processing sections along production line 41 in order to check and, if necessary, correct the processing conditions in this portion of production line 41. In this respect, provision must be made in the control of the production line 41 for test bodies 1 to be recognized by it as having a specific contour, for example by the transmission of further signals, for example an electronic identifier of the respective test body 1, to the detection unit of the production line 41. In addition, the control system must provide different process conditions for the test body 1, in particular a shorter exposure time at the heating stations 47. Furthermore, a loading and unloading of test bodies 1 into the production line 41 independent of the input and output unit 45 shall also be provided. In particular, the production line, especially its control, shall be able to load and/or unload test bodies before or after the heating stations 47 and/or forming stations 47.

The previously described embodiments can be combined in various ways. In particular, aspects of the method may also be used for embodiments of the device as well as use of the device, and vice versa. Additionally, it should be noted that "comprising" does not exclude other elements or steps, and "one" or "a" does not exclude a plurality. The features disclosed in the foregoing description, figures, or claims may be relevant to the realization of the invention in the various embodiments, either individually or in any combination.

LIST OF REFERENCE SIGNS 1 test dummy
3 base body
5 receptacle portion
7 detecting portion
9 receptacle portion-side longitudinal end
11 detecting portion-side longitudinal end
13 detecting portion-side edge of the receptacle portion
15 receptacle portion-side edge of the detecting portion
17 intermediate portion
19 transmission apparatus
21 receptacle portion-side end face
23 connecting cable
25 connection socket
27 measuring areas
29 measuring points
31 signal cable
33 power cable
35 clamping jaws
37 outlet opening
39 gas burner
41 production line
43 receiving roundel
45 input and output unit
47 heating station
49 forming station
D axis of rotation
L longitudinal direction
R radial direction
U circumferential direction

The invention claimed is:

1. A method for detecting at least one process variable in the manufacture of glassware of identical or similar design along a production line, said method comprising:
adapting at least one test dummy to the glassware with respect to shape and dimensions, wherein each of the at least one test dummy comprises:
a base body adapted to have a shape and/or dimensions of the glassware for at least one time period of movement along the production line,
at least one sensor system mounted on the base body for detecting the at least one process variable, and
at least one transmission apparatus attached to the base body for transmitting the at least one detected process variable to a digital receiving unit;

integrating the at least one test dummy into the production line in order to pass the at least one test dummy through the production line instead of glassware;

detecting the at least one process variable of the production line on or in the at least one test dummy;

transmitting the at least one detected process variable to a digital receiving unit;

analyzing the transmitted at least one process variable; and changing one or more process conditions along the production line on the basis of the analysis by modifying the at least one process control variable during operation of the production line, wherein the at least one process control variable is selected from a group consisting of: a burner gas composition, a gas mixing ratio, a flame distance, a flame position, a distance between burner flames, an arrangement of burner flames around the glassware, and combinations thereof.

2. The method according to claim 1, wherein the at least one test dummy passes through the production line below limit values of process conditions of the production line.

3. The method according to claim 2, wherein the process conditions do not exceed a limit value of a surface temperature of 500° C. at least at a section of the test dummy.

4. The method according to claim 1, wherein the test dummy partly passes through the production line, and at least one predefined portion of the production line, wherein the test dummy is integrated into the production line exclusively in the at least one predefined portion of the production line.

5. The method according claim 1, further comprising determining a correlation between the at least one process variable detected by means of the test dummy and the at least one process variable during the manufacture of the glassware in a time portion immediately before, during or after an at least partial processing of the glassware within the at least one portion of the production line.

6. The method according to claim 1, wherein the at least one process variable comprises surface temperature of the test dummy.

7. The method according to claim 1, wherein the modification of the at least one process control variable comprises a minimization or maximization of an effect on the at least one process variable.

8. The method according to claim 1, wherein the production line comprises at least one receptacle able to hold glassware or the test dummy, and a conveying apparatus for moving the at least one receptacle along the production line.

* * * * *